United States Patent
Coverston et al.

(10) Patent No.: US 8,015,215 B2
(45) Date of Patent: Sep. 6, 2011

(54) DELEGATION IN A FILE SYSTEM WITH DISTRIBUTED COMPONENTS

(75) Inventors: Harriet G. Coverston, New Brighton, MN (US); Anton B. Rang, Houlton, WI (US)

(73) Assignee: Oracle America, Inc., Redwood City, CA (US)

( * ) Notice: Subject to any disclaimer, the term of this patent is extended or adjusted under 35 U.S.C. 154(b) by 785 days.

(21) Appl. No.: 11/510,110

(22) Filed: Aug. 24, 2006

(65) Prior Publication Data

US 2008/0065583 A1 Mar. 13, 2008

(51) Int. Cl.
*G06F 17/30* (2006.01)
*G06F 7/00* (2006.01)

(52) U.S. Cl. ......... 707/803; 707/758; 707/822; 707/828

(58) Field of Classification Search .................. None
See application file for complete search history.

(56) References Cited

U.S. PATENT DOCUMENTS

| | | | | |
|---|---|---|---|---|
| 5,165,031 A * | 11/1992 | Pruul et al. | ...... | 714/25 |
| 5,437,026 A * | 7/1995 | Borman et al. | ...... | 707/202 |
| 5,590,334 A * | 12/1996 | Saulpaugh et al. | ...... | 719/315 |
| 5,889,952 A * | 3/1999 | Hunnicutt et al. | ...... | 709/219 |
| 6,393,459 B1 * | 5/2002 | Lurndal | ...... | 709/203 |
| 6,584,582 B1 * | 6/2003 | O'Connor | ...... | 714/21 |
| 6,732,124 B1 * | 5/2004 | Koseki et al. | ...... | 707/202 |
| 6,782,389 B1 * | 8/2004 | Chrin et al. | ...... | 707/10 |
| 6,856,993 B1 * | 2/2005 | Verma et al. | ...... | 1/1 |
| 7,185,047 B1 * | 2/2007 | Bate et al. | ...... | 709/202 |
| 2004/0111608 A1 * | 6/2004 | Oom Temudo de Castro et al. | ...... | 713/156 |
| 2007/0027892 A1 * | 2/2007 | Sakaniwa et al. | ...... | 707/102 |

\* cited by examiner

*Primary Examiner* — Greta L Robinson
*Assistant Examiner* — James J Wilcox
(74) *Attorney, Agent, or Firm* — Brooks Kushman P.C.

(57) ABSTRACT

Various systems and methods of a distributed file system architecture are disclosed. A method for creating a file may include receiving a message to open or create a file with a given name from a file system call handler. Once the message has been received a determination may then be made as to whether a file with the given name exists. If no file with the given name exists, then a new file with the given name may be created and assigned a globally unique file number.

14 Claims, 11 Drawing Sheets

DELEGATION IN A FILE SYSTEM WITH DISTRIBUTED COMPONENTS

FIELD OF INVENTION

An embodiment of the invention relates to the storage of data, and more particularly to a distributed file system architecture.

BACKGROUND OF INVENTION

Computer systems have long been used to manage business related information. However, costs associated with storage, communication and information processing prohibited the use of computers to store and to manage other kinds of data. When costs came down, it became feasible to digitize and store other forms of data, including digitized data. Digitized data primarily consists of digitized visual images, audio and video, although is not limited to those types of data. Advanced information management system structures are implemented to store and manage digitized data.

In a shared or distributed file system, one or more central servers mediate access to files. When many computers or processors access a particular set of files, the central servers become a bottleneck. It is thus desirable to avoid accessing the central servers for normal file operations.

SUMMARY OF INVENTION

Various embodiments of the present invention generally relate to a distributed file system architecture. In one embodiment a method for creating a file may include receiving a message to open or create a file with a given name from a file system call handler. Once the message has been received a determination may then be made as to whether a file with the given name exists. If no file with the given name exists, then a new file with the given name may be created and assigned a globally unique file number.

In one embodiment, a method may include receiving a request from a requesting device for a message port address associated with a file manager responsible for a file being requested by the requesting device. Then, a determination may be made as to which file manager is responsible for the file. Once the determination has been made as to which file manager is responsible for the file, the message port of the file manager may be returned to the requesting device.

In various embodiments, a computer-readable storage medium containing a set of instructions causing one or more processors to perform various operations is disclosed. In one embodiment, the computer-readable storage medium may include instructions to receive a message to open or create a file with a given name from a file system call handler. In addition, instructions may be included which cause one or more processors to determine if a file with the given name exists and then create a new file with the given name, if no file with the given name exists. In one embodiment, additional instructions to assign a globally unique file number to the new file may be included on the computer-readable medium.

BRIEF DESCRIPTION OF THE DRAWINGS

The invention may be best understood by referring to the following description and accompanying drawings that are used to illustrate embodiments of the invention. In the drawings.

DETAILED DESCRIPTION

A distributed file system is disclosed. In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly herein, a carrier wave shall be regarded as comprising a machine-readable medium.

Figure 1:
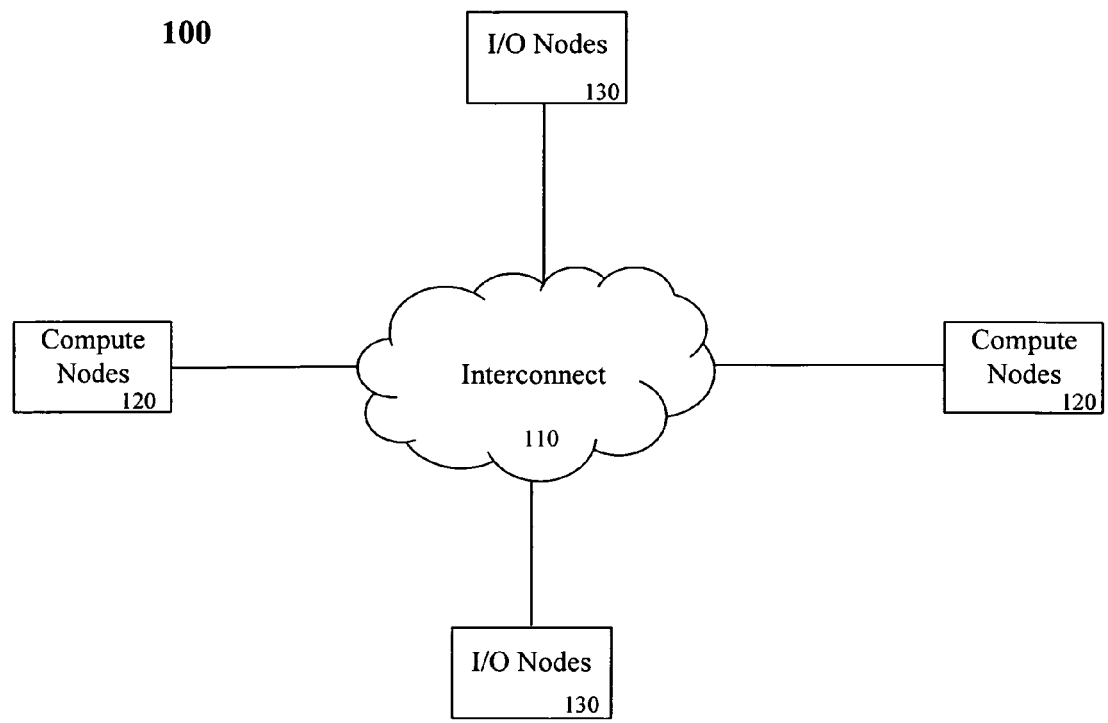
FIG. 1 illustrates one embodiment of a file system network.

FIG. 1 illustrates one embodiment of a file system network 100. Network 100 includes an interconnect 110, which couples compute nodes 120 and input/output (I/O) nodes 130. Compute nodes 120 proxy I/O services implemented in various libraries, and/or system kernel. I/O nodes 130 implement I/O services. In one embodiment, each I/O node 130 runs a dedicated operating system kernel instance. In a further embodiment, services may be user processes and/or kernel threads. Further, I/O hardware (not shown) is coupled to each I/O node 130.

Figure 2:
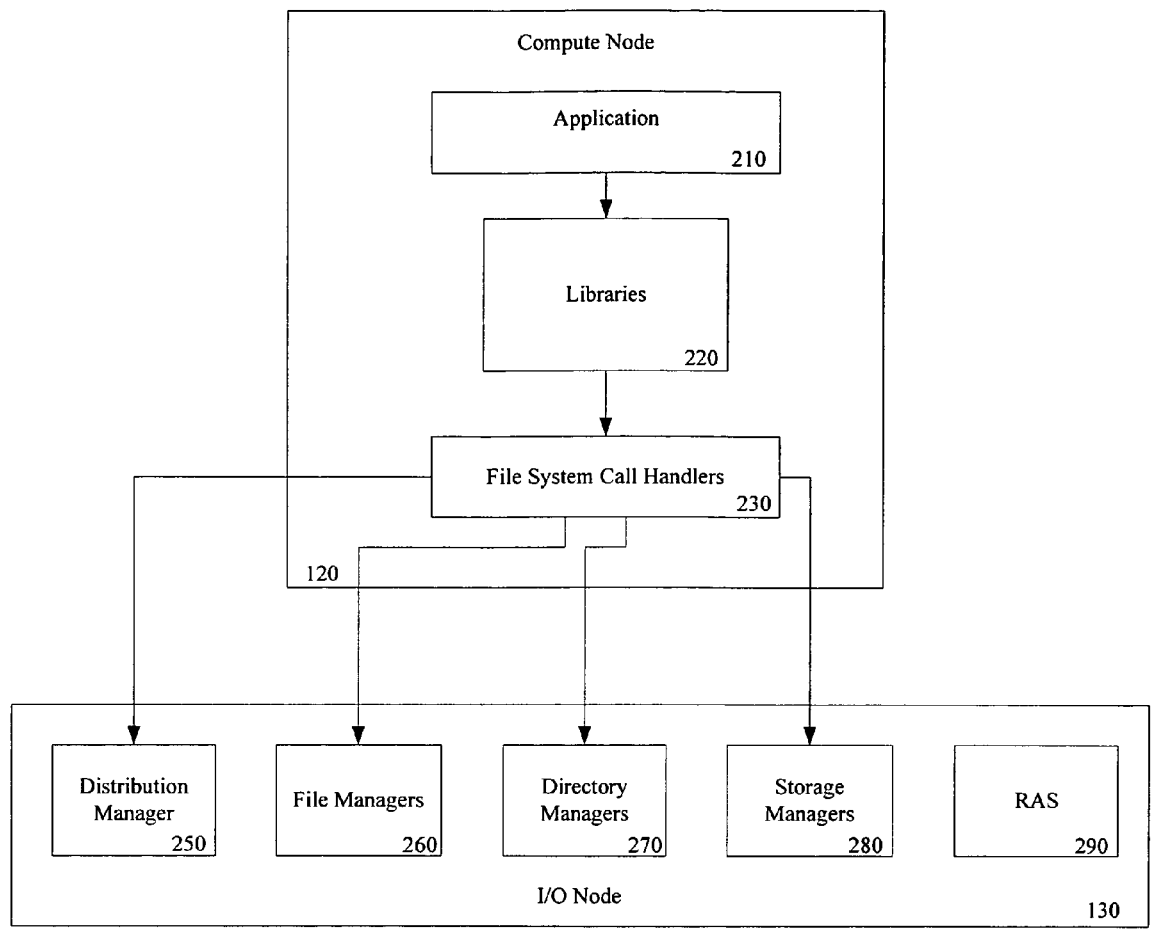
FIG. 2 is a block diagram illustrating one embodiment of a file system architecture.

FIG. 2 is a block diagram of a file system architecture illustrating a more detailed embodiment of a compute node 120 and I/O node 130. Compute node 120 includes application 210, libraries 220 and file system call handlers 230. Application 210 is an application program to perform a specific function. Application 210 performs I/O through libraries 220. Libraries 220 include language support libraries (e.g. libc for C programs, and the library implementing FORTRAN I/O) as well as parallel I/O libraries such as MPI I/O. Providing optimized versions of these libraries allows applications to run more efficiently on the file system with no source code changes.

File system call handlers 230 communicate with I/O nodes 130. Call handlers 230 provide applications 210 APIs defined by the Portable Operating System Interface (POSIX), as well as other interfaces designed to improve performance of both serial and parallel I/O operations. Call handlers 230 may take advantage of shared memory to share state across node boundaries, as well as use a message port system to communicate with other compute nodes 120 and I/O nodes 130.

The message port system is the primary communication mechanism for the file system. However, shared memory may be used for all data transfer. In one embodiment, file system messages are treated as asynchronous remote procedure calls. Whenever a message is received, an available thread runs the requested code on the destination node, and will generally send a reply message after completion.

Messages sent to the local node bypass the interconnect 110, which is useful as the many components of the file system (including one for each open file) are mapped onto a relatively small number of I/O nodes, allowing many operations to be performed locally. In a further embodiment, the file system uses a logging mechanism to ensure that requests sent to an I/O node 130 can be recovered if that node fails. This recovery process is described below in more detail.

File system scalability is achieved by distributing and load balancing components across I/O nodes 130. Thus, I/O nodes 130 include various components (or managers) to carry out functions. File system components can be thought of as objects in an object-oriented programming style. The components are state information together with the methods which operate on that state. In particular the components are very lightweight (e.g., creating a component requires only that its state be allocated and initialized and that a message port be created for method requests). A message sent to a component simply invokes a procedure with that components' state as a parameter.

In one embodiment, components are identified by a unique name. For directories and files, the name is the file number. For storage managers, the name is the unique ID of the storage device. Several components have a globally unique name within the file system (e.g. a distribution manager).

I/O node may include one or more distribution managers 250, one or more file managers 260, one or more directory managers 270, one or more storage managers 280 and a RAS component 290. A distribution manager 250 provides a lookup service for compute nodes 120 and I/O nodes 130 to find where messages for other file system components should be directed.

Figure 3A:
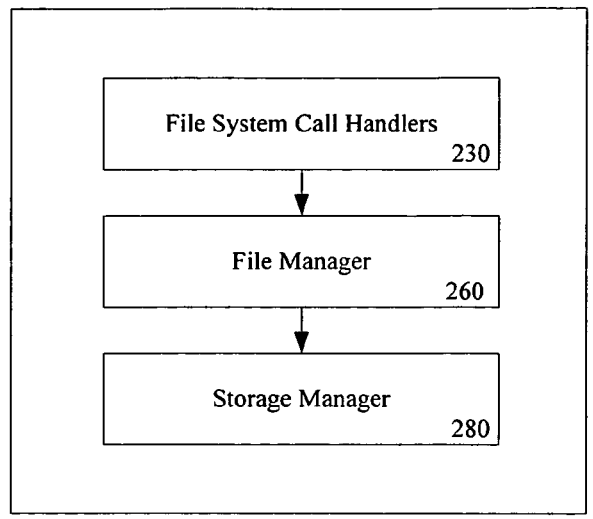
FIGS. 3A and 3B illustrate embodiments of file system calls.
Figure 3B:
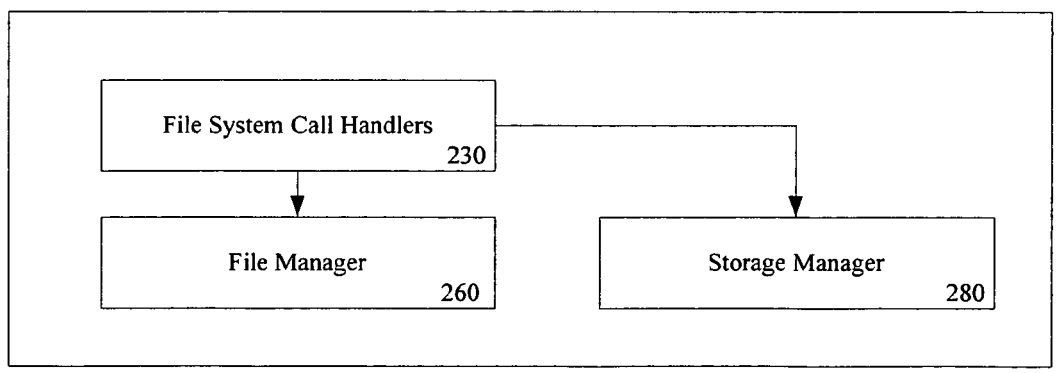

File system call handlers 230 use the distribution manager 250 to locate the directory managers 270 and file managers 260 responsible for files being accessed by the application. Many system calls are essentially passed through to the underlying manager. FIG. 3A illustrates the system call from call handlers 230. Read and write operations, however, can be optimized through a technique called delegation. A file manager 260 can delegate responsibility for a whole file, or a range within the file, to a group of compute nodes 120. The file system call handlers 230 within that group can then communicate directly with the storage managers 280, initiating I/O to disk on their own. FIG. 3B illustrates the system call from call handlers 230 using delegation.

Referring back to FIG. 2, distribution managers 250 also start instances of file system components when necessary. For instance, the first time that a directory is accessed, the distribution manager will select an I/O node 130 as the home of that directory, instantiate a directory manager on that node for the directory, and supply the address of that manager (a message port) to the node which had requested access to the directory. The distribution manager is located using a global, well-known message port. This is in the system-wide message port namespace. The distribution manager is initialized, registering its location under this well-known name, as part of file system bootstrap. Once the distribution manager is running, all other file system components are located through its services.

Figure 4:
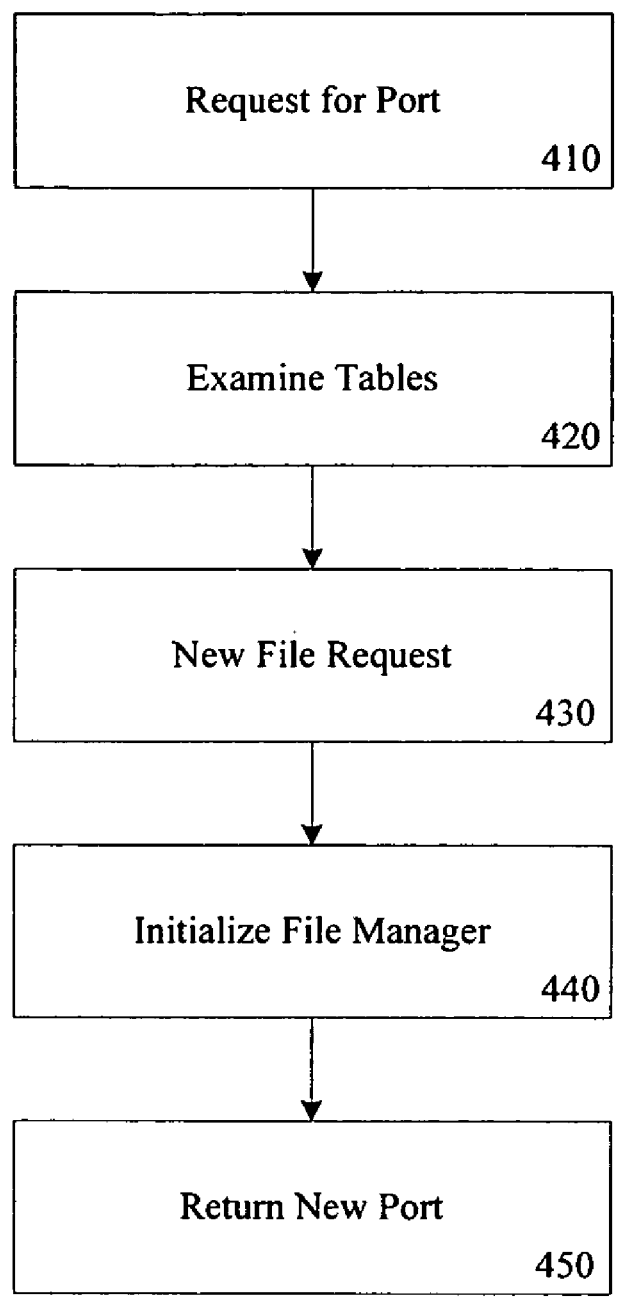
FIG. 4 is a flow diagram illustrating one embodiment of operation for a distribution manager.

FIG. 4 is a flow diagram illustrating the operation of distribution managers 250. At processing block 410, a requesting component sends a request to the distribution manager 250 for the port of the file manger 260 for a file X via a well-known message port. At processing block 420, the distribution manager 250 examines its tables and determines that there is no file manager 260 for file X and selects an I/O node 130 which will host the new file manager 260.

At processing block 430, the distribution manager 250 requests that an operating environment on the selected I/O node 130 create a new file manager 260 for file X. At processing block 440, the file manager 260 is initialized and is assigned a message port. At processing block 450, the new port is returned to the requesting component. The requesting component may then communicate directly with the new file manager.

Lookup results are cached by the requesting component so that the distribution manager 250 is normally accessed only the first time that a file or directory is accessed by an application 210. In one embodiment, the use of shared memory allows all threads or processes within an application 210, even an MPI application, to share this cache. Since the services managed by the distribution manager 250 rarely move between nodes, there is no provision for invalidating caches. Rather, an attempt to send a message to an invalid message port will fail, prompting the sender to query the distribution manager 250 for the new location of the manager.

Figure 5:
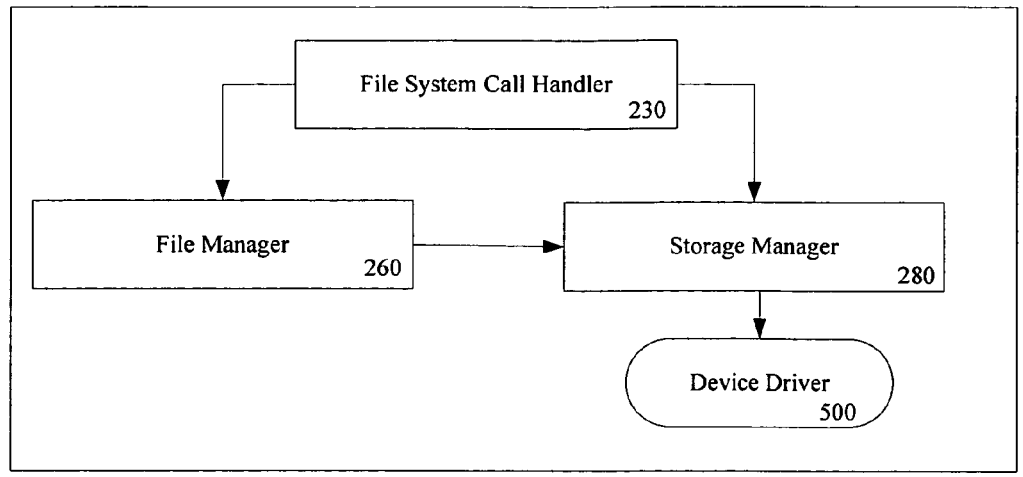
FIG. 5 illustrates one embodiment of data path components.

Referring back to FIG. 2, file manager 260 and storage manager 280, along with file system call handlers 230 and a device driver 500 are data path components. FIG. 5 illustrates one embodiment of the data path components. A file manager 260 coordinates access to a single file. In most cases where a file has been opened only by one application, read and write operations are delegated to the group of compute nodes on which that application runs. In one embodiment, the use of object storage enables the storage devices to manage their own allocation of space and help to ensure a consistent state for the file system in the event of failure.

In some cases, the file manager 260 cannot delegate access to an entire file. For instance, multiple jobs may have opened the file, or the file may be shared via parallel NFS (pNFS). In such instances, the file manager 260 remains involved with file I/O, coordinating cache and metadata consistency, and enforcing POSIX atomicity rules between jobs. In this case, the file manager 260 can choose either to delegate access to ranges of the file or to perform all read and write calls on behalf of its clients.

The file manager is responsible for ensuring POSIX atomicity when required by applications (this is the default for applications written in the C language and those which invoke the POSIX interfaces directly). Applications which do not require atomicity can disable the associated locking through a call to the file manager or through the use of appropriate APIs within libraries such as MPI-IO. Note that for delegated files, the file system call handlers 230 manage atomicity.

A storage manager 280 coordinates access to a single object storage device. The storage manager 280 is invoked by the file manager 260 and directory managers 270, but can also be invoked directly by file system call handlers 230 if the file manager 260 has delegated a portion of a file. This allows most read and write operations to be performed with a single round-trip message.

If there are multiple physical paths to the device, the storage manager 280 is responsible for load balancing and recovery from path failures which leave the device connected along at least one path. Note that the RAS component 290, discussed below, is responsible for determining the existence of a fault and coordinating response to the fault. If multiple paths exist for failover, all paths should be controlled by the same storage server.

Storage managers 280 do not aggregate multiple devices into a single storage unit (e.g., they are not volume managers). A storage manager 280 need not be located on the node to which the storage device is attached. A storage manager 280 is independent from the device driver 500, and can reside on an I/O node 130 while controlling a storage device attached to a compute node 120, which provides flexibility in system configuration.

Figure 6:
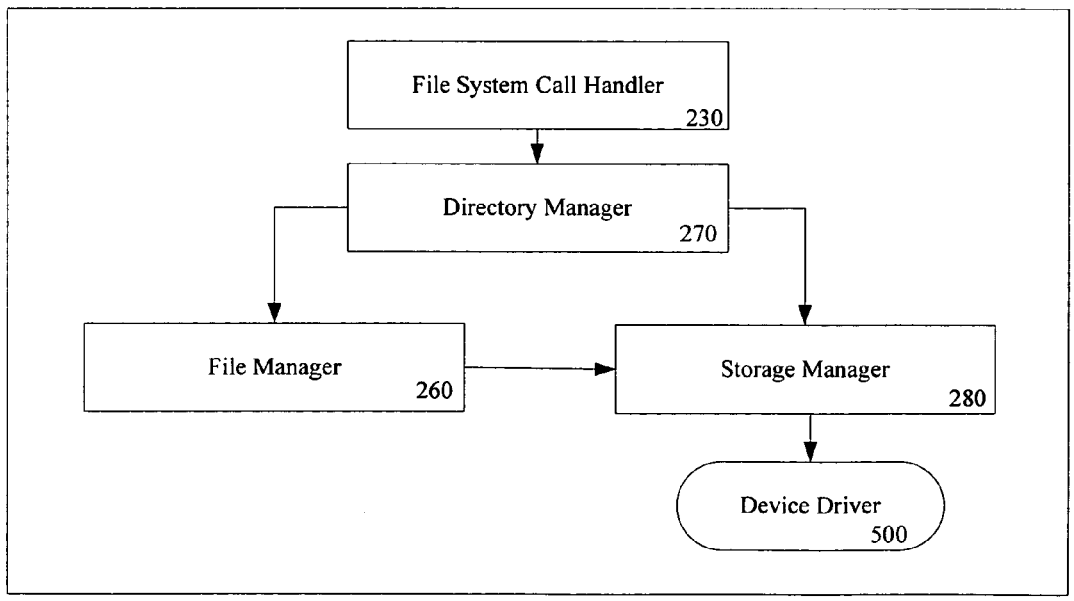
FIG. 6 illustrates one embodiment of metadata components.

Referring back to FIG. 2, directory manager 270, along with file system call handlers 230, file managers 260, storage manager 280 and device driver 500 are meta-data components. FIG. 6 illustrates one embodiment of metadata components. A directory manager 270 coordinates access to a single directory. All lookup operations are performed by the directory manager 270, which thus must be able to handle a heavy load. To facilitate this, directories may be fully cached in the memory of an I/O node while they are in use. Updates may be performed very quickly on the in-memory structures, while a log is used to ensure file system integrity. The log can be stored on non-volatile RAM, when available, for even faster performance.

Figure 7:
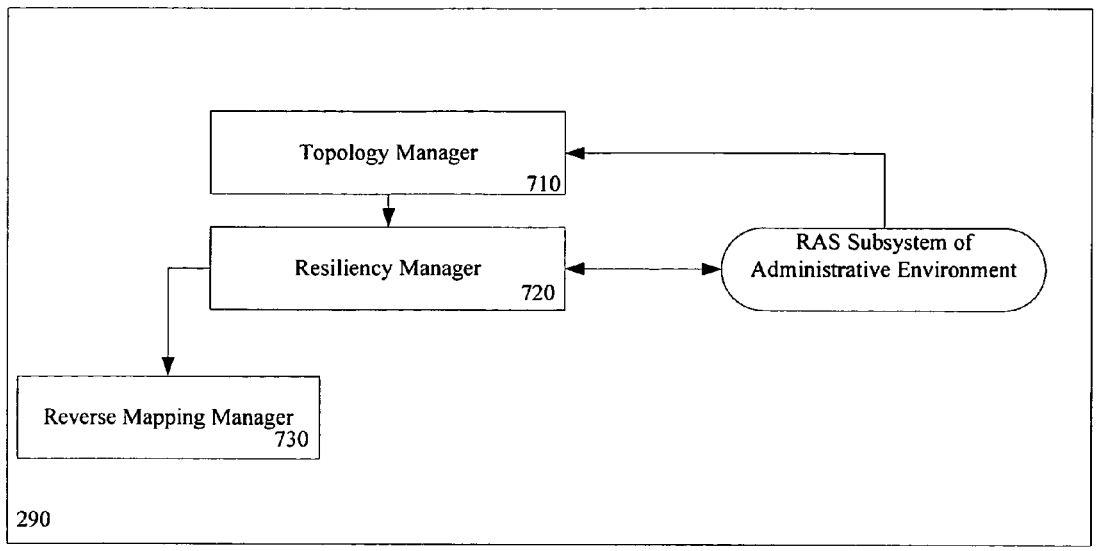
FIG. 7 illustrates one embodiment of a RAS component.

As discussed above RAS component 290 is implemented to determine the existence of faults and to coordinates a response to the fault. FIG. 7 illustrates one embodiment of a RAS component 290. RAS component 290 includes a topology manager 710, resiliency manager 720 and reverse mapping manager 730. The topology manager 710 handles the file system's knowledge of connectivity and fault domains. Topology manager 710 does not discover this information itself, acting instead as an interface to an administrative environment's RAS and connectivity functions.

The topology manager 710 is used for a variety of purposes, including determining all available paths to storage devices, finding storage in separate fault domains, and monitoring changes in system state due to faults during operation. As discussed above, topology manager 710 does not detect the faults, nor respond to them other than by updating its mappings. Rather, topology manager 710 determines faults by registering for notifications from the RAS subsystem of the administrative environment, and propagates them to the resiliency manager 720, as well as to other interested file system components, such as storage managers 280.

The resiliency manager 720 is responsible for ensuring that all file system data and metadata is protected from failures. In one embodiment, a user or application may disable such protection, which may be useful to increase performance for transient data of low value (e.g. debugging output or short-lived temporary files). After a topology change or other fault, the resiliency manager 720 determines which file system objects have been affected. This may be user data or file system metadata, on either stable storage or NVRAM. Resiliency manager 720 manages the process of restoring redundancy (e.g. re-mirroring data), invoking the data scheduler as needed. In the event of the loss of data, resiliency manager 720 notifies the appropriate file system components and informs the RAS subsystem, which can present that information to the administrator.

The reverse mapping manager 730 is used by the resiliency manager 720 to determine which file system objects reside on a given piece of media (e.g., disk, tape, or NVRAM). In the event of media failure, the resiliency manager 720 uses this information to drive the reconstruction or notification process. This information is also used in other cases where knowledge of the objects on media is required, for instance when taking storage out of service. In one embodiment, this information cannot be stored on the media in question, as it is needed if the media becomes unavailable. Reverse mappings are kept up-to-date by components which allocate storage space, for instance, file and directory managers as well as a data scheduler.

Figure 8:
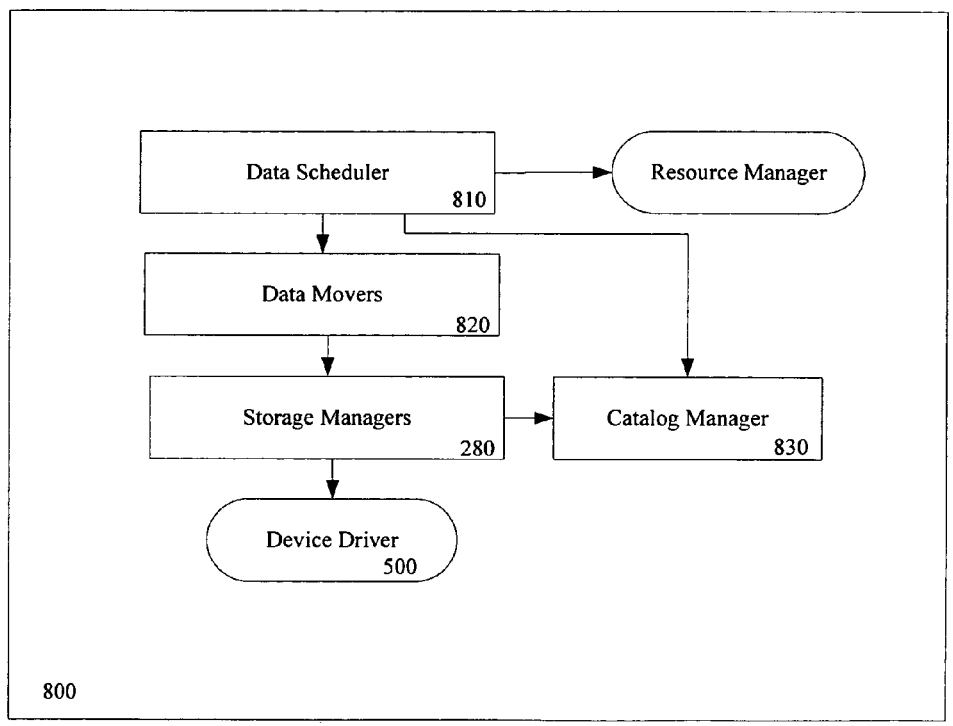
FIG. 8 illustrates one embodiment of data management components.

The file system includes a data management component that supports multiple pools of storage (e.g., high speed disk, high capacity disk, tape, etc.). FIG. 8 illustrates one embodiment of data management components 800. Data management components 800 include data scheduler 810, data movers 820, catalog manager 830, as well as storage manager 280 and device driver 500.

The data scheduler 810 implements policy-based data management for tiers of storage. Data scheduler 810 ensures that multiple copies of data exist for RAS, based on policies set by the administrator. Data scheduler 810 invokes data movers 820 to copy data between storage tiers based on access patterns or other policies. Frequently accessed files can be moved to faster storage tiers, while infrequently accessed files may be moved to slower storage tiers. The data scheduler 810 is also responsible for media migration. Migration is used to protect against media deterioration, move data to new classes of media, and to reclaim space on sequential media.

Data movers 820 are responsible for copying data from one storage tier to another. The storage tiers may utilize disk, tape, or other media. Data movers 820 take advantage of third-party copy whenever possible to avoid impacting the I/O nodes 130. The catalog manager 830 keeps information about individual pieces of media (e.g., disk or tape). Information kept includes an estimate of space utilization, an error history for use by the RAS components 290, and possibly a performance history as well. Space utilization is updated when media is taken offline, or periodically by storage managers. For sequential media, obsolete space is also tracked. In addition to the components described above, the file system can interface with an external resource manager, which allows integration of shared resources such as tape libraries with other file systems.

Figure 9:
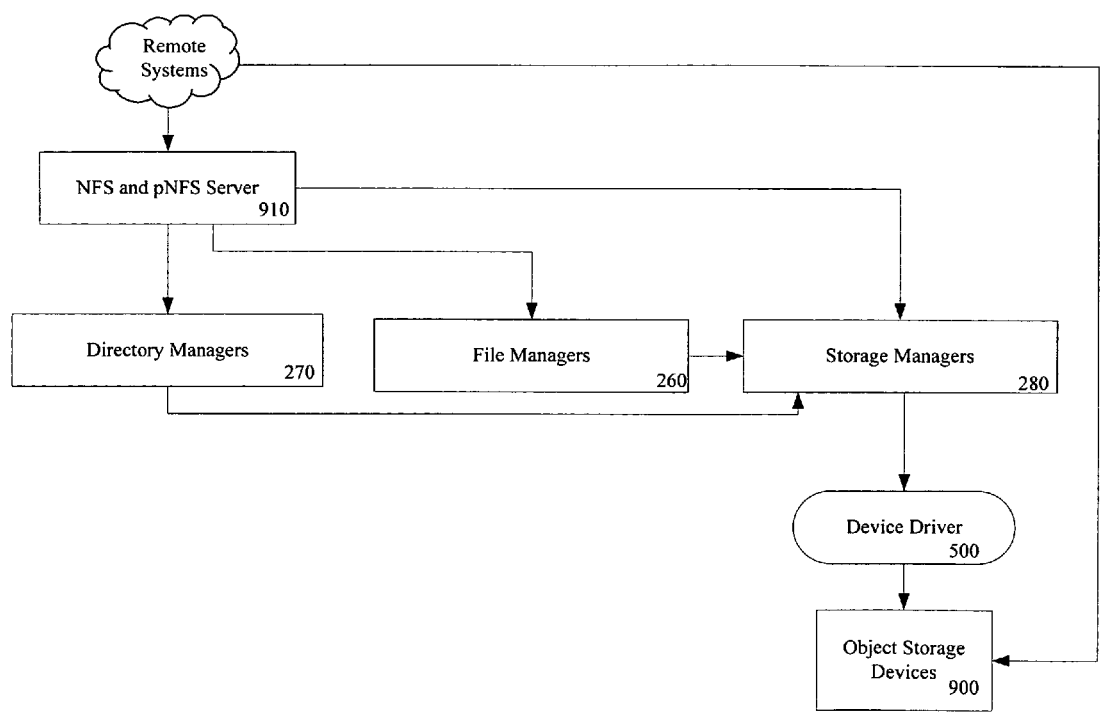
FIG. 9 illustrates one embodiment of data sharing components.

FIG. 9 illustrates one embodiment of data sharing components. Data sharing in the file system can be performed in several ways. A pNFS server 910 allows clients connected to the storage network to access storage devices directly. An integrated object storage security server allows for secure access to disks by untrusted clients. The file system may operate as a client to remote file systems, including pNFS. File system clients such as Lustre and Panasas can be integrated by third parties. As with standard UNIX systems, this integration is done at a mount point level, with the ability to configure automatic mounts. The shared memory architecture allows file system client code to run on an I/O node while directly delivering data to compute nodes 120.

The file system includes a semantic access component that assists in propagating metadata automatically to a private database. Further, the semantic access component supports interfaces to allow users to add metadata to this database. Metadata from well-structured files can be added to the database automatically via plug-ins. The database enables fast criteria-based searching, such as date ranges, user and project identification, etc.

Figure 10:
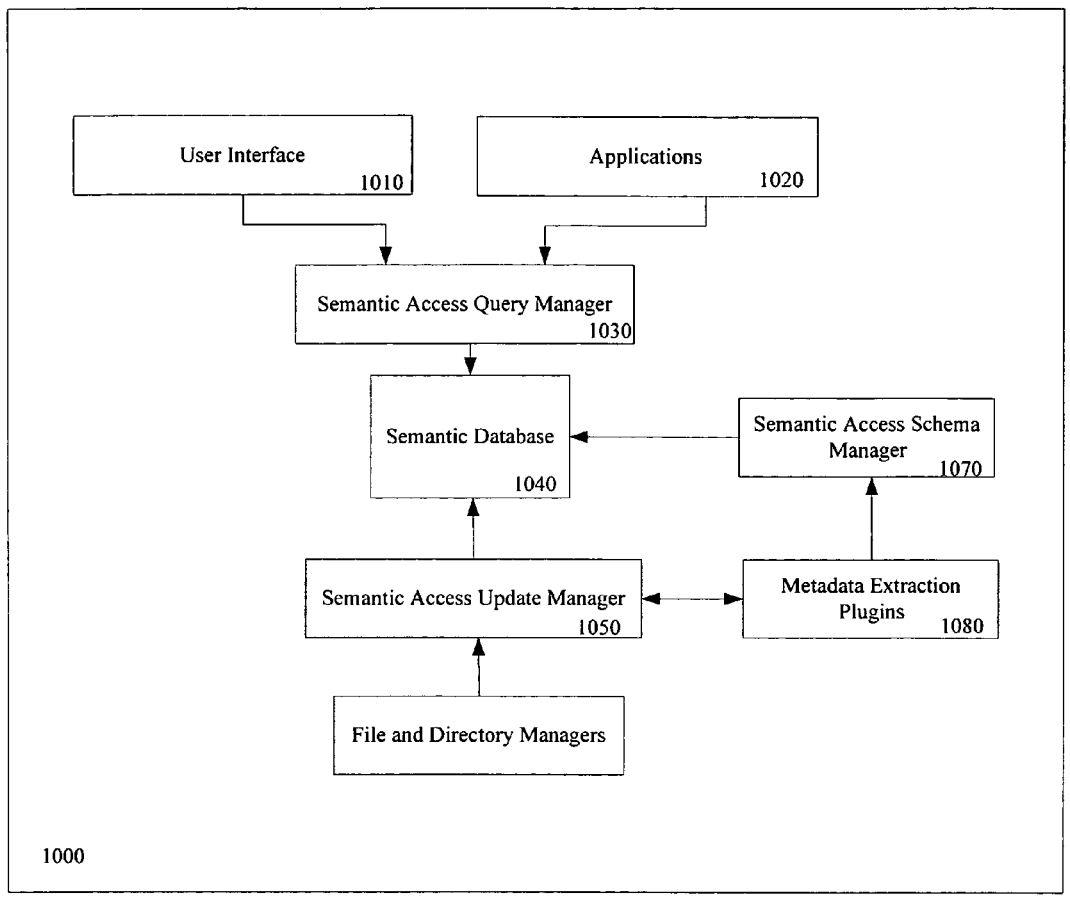
FIG. 10 illustrates one embodiment of semantic access components.

FIG. 10 illustrates one embodiment of semantic access components. A semantic access query manager 1030 provides facilities for searching file system and user-supplied metadata to locate files. Semantic access query manager 1030 utilizes the private database, which is independent from the file system and does not communicate directly with other file system components. A semantic access update manager 1050 monitors changes to the file system and updates the databases used by the semantic access query manager 1030.

Updates are made in the background so that file system performance is unimpeded. A semantic database 1040 can be extended to include metadata derived from file contents. Metadata extraction plug-ins 1080 enable new extraction methods to be defined by a file system administrator. The plug-ins 1080 may be automatically invoked by the update manager 1050 when file contents change. A semantic access schema manager 1070 works with plug-ins 1080 to allow the database schema to be extended for new types of metadata.

File Creation and Writes

In one embodiment, the processes of file creation and file writes presume direct I/O access. However in other embodiments, files may be cached. In such embodiments, caching is coordinated either by file manager 260 or file system call handlers 230. To create a file, an application 210 may use POSIX open( ) or creat( ) functions.

Figure 11:
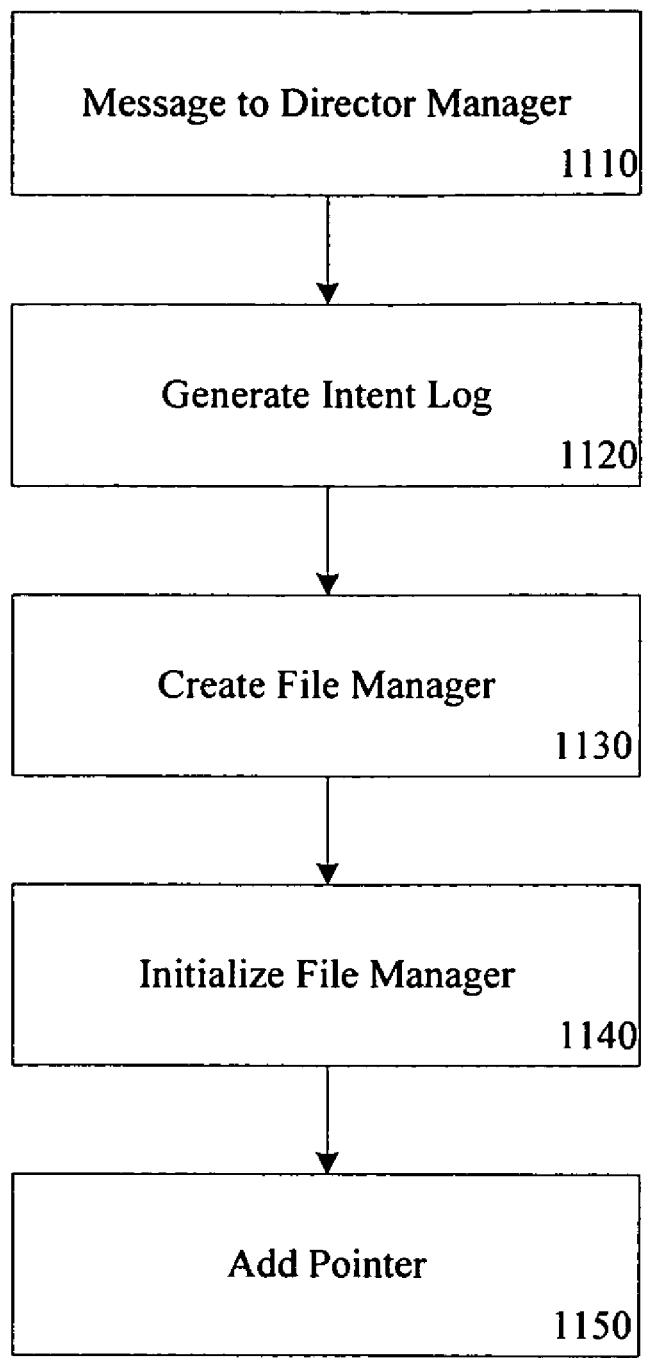
FIG. 11 is a flow diagram illustrating one embodiment of creating a file.

FIG. 11 is a flow diagram illustrating one embodiment of creating a file. At processing block 1110, the execution of either of the open( ) or creat( ) functions will cause the file system call handler 230 to send a message to the directory manager 270 for the working directory of the process. However, in other embodiments, a message may be sent to another directory manager 270 that may be found using lookup operations, if a path is given.

Subsequently, the directory manager 270 will check for an existing file with the given name. If no such file exists, a new file will be created. The new file will be assigned a globally unique file number. At processing block 1120, an intent log record is generated to ensure that the file creation is completed in the event of a system failure. The new file is initially empty, and will not be assigned to a data device.

At processing block 1130, the directory manager 270 will use the distribution manager 250 to create a file manager 260 for the newly created file. At processing block 1140, the file manger 260 is initialized with the appropriate default attributes for the file. In one embodiment, the default attributes for the file are based on the creating process's credentials and the arguments to the open/creat call. In a further embodiment, the default attributes for the file may also be based on the attributes of the directory in which the file is being created.

At processing block 1150, a pointer to the file is added to the directory once the file has been initialized. Subsequently, the directory manager 270 will then return a successful creation status, together with the message port of the newly created file manager 260, to the file system call handler 230. The file system call handler 230 will create a UNIX file descriptor and associate the file descriptor with the message port, and return the number of the file descriptor to the application 210.

As discussed above with respect to FIGS. 3A and 3B, system calls such as file write operations may be implemented via an underlying manager (e.g., non-delegation) and delegation (e.g., a file manager 260 delegating responsibility for a whole file, or a range within the file, to a group of compute nodes 120). An application 210 can write to a file using a POSIX write( ) call. The file system call handler 230 will verify that a buffer passed by an application 210 is readable and will lock the buffer to a physical address, receiving a global address which will be used when sending messages.

Figure 12:
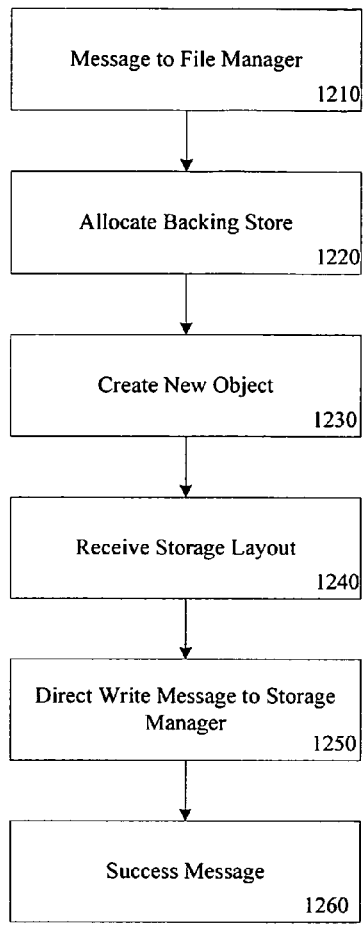
FIG. 12 is a flow diagram illustrating one embodiment of writing to a file.

FIG. 12 is a flow diagram illustrating one embodiment of writing to a file with delegation. At processing block 1210, the file system call handler 230 sends a message to the file manager 260, requesting the write. At this point, the file manager 260 may choose to delegate file control. If so, the file manager 260 will not execute the write itself, instead returning a storage layout to the file system call handler 230, which will then contact the storage manager 280 directly.

In this instance, with a newly created file, there is no storage yet. At processing block 1220, the file manager 260 will allocate backing store (e.g., an object on a disk) by contacting a storage manager 280. At processing block 1230, the storage manager 280 will create a new object for the file and return the object to the file manager 260. The file manager 260 will record the identifier of the new object in the file node. In one embodiment, a log is used to ensure this assignment is not lost in the event of failure.

The file manager 260 also chooses a range for the object. According to one embodiment, if the file will be striped the initial range is limited to the stripe size. Finally, the file manager 260 will create a storage layout for the file system call handler 230. This layout indicates the storage objects for the file and the associated byte ranges within the file.

At processing block 1240, the file system call handler 230 caches the storage layout with the file upon receiving the storage layout from the file manager 260. At processing block 1250, the file system call handler 230 will issue a new write message directed to the storage manager 280. The storage manager 280, upon receiving the write, will attempt to write data from the user's buffer (still locked in memory at a known global address) to the storage device. At processing block 1260, the storage manager 280 will respond to the file system call handler 230 with a success message upon completion of the write.

The file system call handler 230 will update the file's size and timestamp. In one embodiment, this can be done locally since the file has been delegated to it. The size and timestamp need not be propagated to the file manager until either the delegation is recalled (e.g. if another application opens the file), an update is requested by the file manager 260 (e.g. a stat( ) call is made from another application 210), or the application 210 requests that the file be made stable on disk (e.g. fsync( ) is called).

Figure 13:
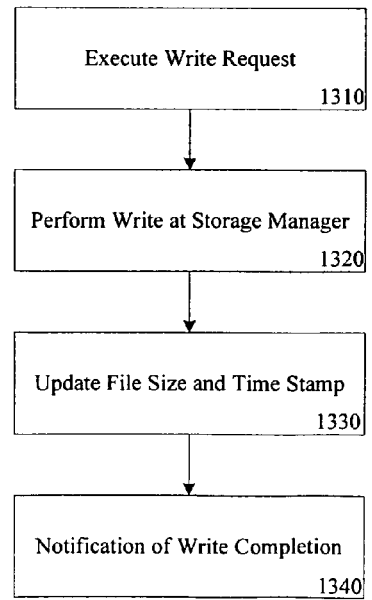
FIG. 13 is a flow diagram illustrating another embodiment of writing to a file.

FIG. 13 is a flow diagram illustrating one embodiment of writing to a file without delegation. At processing block 1310, the file manager 260 will execute the write request before returning status to the file system call handler 230. As discussed above, the file manager 260 will then assign storage to the file. At processing block 1320, the file manager 260 will use the storage manager 280 to perform the write. At processing block 1330, the file manager 260 updates the file's size and timestamp once the write has completed. At processing block 1340, the file system call handler 230 will be notified when the write has finished.

Fault Recovery

According to one embodiment, the file system is designed to recover from the loss of an I/O node 130 without affecting a running application 210. In such an embodiment, the responsibility for recovery is split between compute node 120 and I/O node 130. A compute node 120, when it has sent a message to an I/O node 130, expects to receive a reply indicating that the message has been received.

If the I/O node 130 fails before a reply is sent, the compute node 120 will receive a notification message from the RAS component 290 that the message port has been closed due to node failure. In this instance, the compute node 120 will contact the distribution manager 250 to locate the new message port for the manager 250 in question. When a new manager has been instantiated, its message port will be sent to the compute node 120, which can then re-send the original request.

Some requests involve multiple operations (a transaction) and cannot be simply restarted. To handle these, each node 130 has a request log. When a request that requires a transaction is received, it is placed in the log. These entries are indexed by the sender's identification and a unique identifier generated by the sender. As the request proceeds, the log is updated. In the event of node 130 failure, a recovery process is started on another node 130.

This recovery process cancels any operations that were in progress and allows them to restart. Note that there may also be operations which had completed, but for which a completion message had not yet been sent. Those operations are recorded and matched against retries of the same operation using a unique request identifier.

To support this, the log is replicated onto a second fault domain typically at another node 130. During the recovery period, the distribution manager 250 responds to requests for message ports on the failed node 130 by redirecting requests to the node 130 responsible for recovery, which instantiates new file or directory servers as needed.

If the distribution manager 250 fails, a new distribution manager 250 will be instantiated by the message port subsystem. I/O nodes 130 are notified of the failure through the RAS component 290, and re-register the managers which are running locally with the new distribution manager 250. When all remaining nodes 130 have registered their managers, normal operation resumes.

If errors are detected on a disk or tape, the errors are reported to the administrative environment. If disk's or tape's fault-detection logic determines that the disk or tape should be taken out of service, the resiliency manager 720 will be invoked by the Administrative Environment. This allows the RAS subsystem of the Administrative Environment to analyze failures in the context of the overall system, rather than simply a single device.

Exemplary Computer System

Figure 14:
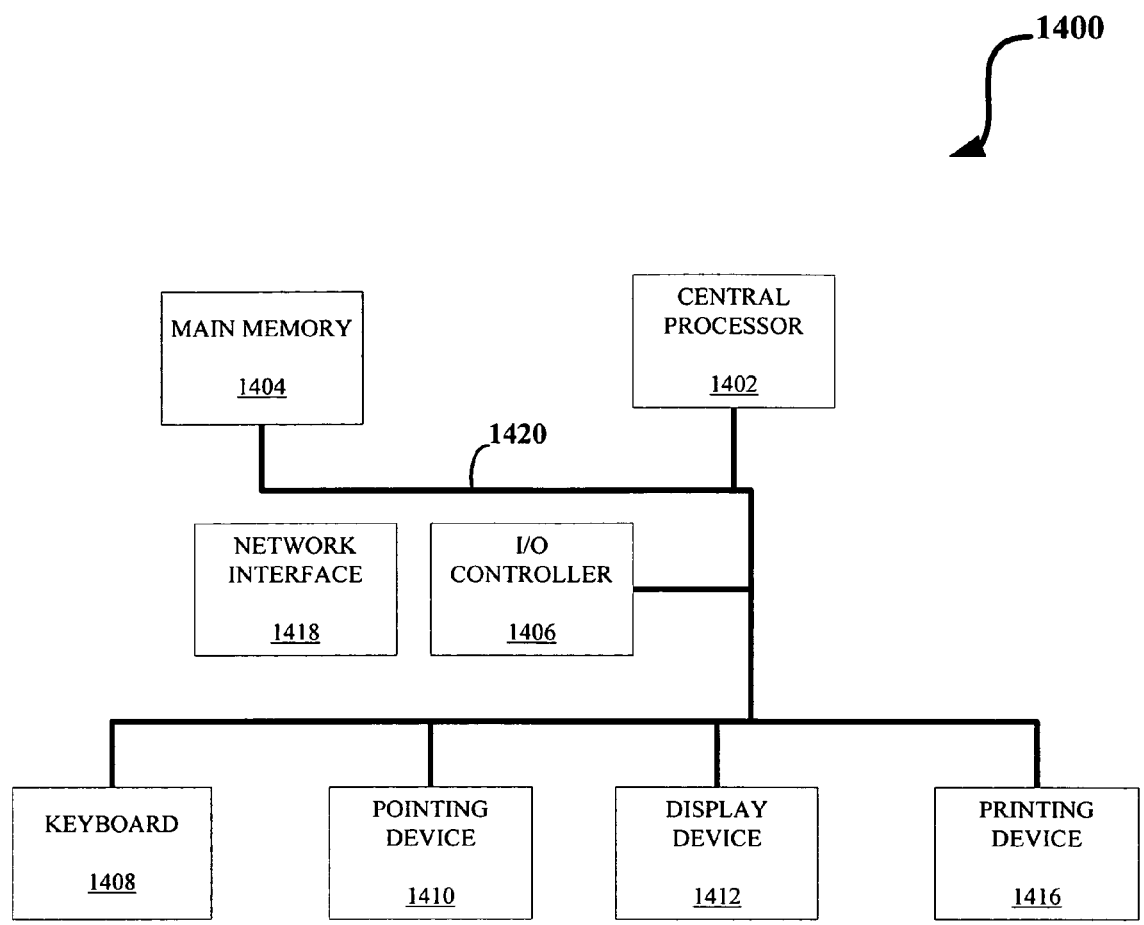
FIG. 14 illustrates one embodiment of a computer system.

FIG. 14 illustrates one embodiment of a computer system 1400 in which various servers, managers and components described above may be implemented. Computer system 1400 comprises a central processor 1402, a main memory 1404, an input/output (I/O) controller 1406, a keyboard 1408, a pointing device 1410 (e.g., mouse, track ball, pen device, or the like), a display device 1412, and the like), and a network interface 1418. Additional input/output devices, such as a printing device 1416, may be included in the system 1400 as desired. As illustrated, the various components of the system 1400 communicate through a system bus 1420 or similar architecture.

In a further embodiment, system 1400 may be a distributed computing system. In other words, one or more of the various components of the system 1400 may be located in a physically separate location than the other components of the system 1400. Such components may be accessed and connected via a network to the other components.

In accordance with an embodiment of the present invention, the computer system 1400 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention.

Also, instead of a single processor, two or more processors (whether on a single chip or on separate chips) can be utilized to provide speedup in operations. It is further envisioned that the processor 1402 may be a complex instruction set computer (CISC) microprocessor, a reduced instruction set computing (RISC) microprocessor, a very long instruction word (VLIW) microprocessor, a processor implementing a combination of instruction sets, and the like.

The network interface 1418 provides communication capability with other computer systems on a same local network, on a different network connected via modems and the like to the present network, or to other computers across the Internet. In various embodiments of the present invention, the network interface 1418 can be implemented utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, wireless networks (such as those implemented by utilizing the wireless application protocol (WAP)), time division multiplexing (TDM), universal serial bus (USB and its varieties such as USB II), asynchronous transfer mode (ATM), satellite, cable modem, and/or FireWire.

Moreover, the computer system 1400 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 1400 is a general purpose computer capable of running any number of applications such as those available from companies including Oracle, Siebel, Unisys, Microsoft, and the like.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A computer-implemented method for creating a file comprising:
   receiving a request message to open or create a file with a given name from a file system call handler;
   determining if a file with the given name exists;
   creating a new file with the given name, if no file with the given name exists;
   assigning, to the new file, a globally unique file number that identifies the file;
   generating an intent log record to ensure that file creation is completed in the event of a system failure;
   allowing a directory manager to use a distribution manager to create a file manager for the new file; and
   initializing the file manager with the appropriate default attributes for the new file, wherein the default attributes for the new file are based at least in part on a creating process's credentials and arguments to the request message.

2. The method of claim 1, further comprising adding a pointer to the new file in a directory once the new file has been initialized.

3. The method of claim 1, further comprising:
   verifying that a buffer passed by an application is readable; and locking the buffer to a physical address.

4. The method of claim 1, further comprising:
   allocating a backing store by contacting a storage manager; and receiving a new object for the file.

5. The method of claim 4, further comprising:
   receiving a storage layout containing information about a storage manager;
   and caching the storage layout with the file.

6. The method of claim 4, further comprising updating file size and timestamp.

7. A computer-implemented method comprising:
   receiving a request from a requesting device for a message port address associated with a file manager responsible for a file being requested by the requesting device;
   determining which file manager is responsible for the file;
   returning to the requesting device the message port of the file manager which was determined to be responsible for the file;
   sending a new file manager request to an input/output node if it was determined that no file manager was responsible for the file;
   initializing a new file manager by assigning a message port, wherein the new file manager is responsible for the file; and returning the message port of the new file manager to the requesting device.

8. The method of claim 7, wherein determining which file manager is responsible for the file comprises examining tables containing information about file association with file managers.

9. The method of claim 7, wherein the request is received through a message port.

10. A computer-readable storage medium containing a set of instructions causing one or more processors to:
    receive a request message to open or create a file with a given name from a file system call handler;
    determine if a file with the given name exists;
    create a new file with the given name, if no file with the given name exists;
    assign, to the new file, a globally unique file number that identifies the file;
    initialize the file manager with default attributes for the new file, wherein the default attributes for the new file are based at least in part on a creating process's credentials and arguments to the request message;
and allow a directory manager to use a distribution manager to create a file manager for the new file.

11. The computer-readable storage medium of claim 10, further comprising instructions to cause one or more processors to generate an intent log to ensure that file creation is completed in the event of a system failure.

12. The computer-readable storage medium of claim 10 further comprising instructions to cause one or more processors to add a pointer to the new file in a directory once the new file has been initialized.

13. The computer-readable storage medium of claim 10, further comprising instructions to cause one or more processors to:
    verify that a buffer passed by an application is readable; and lock the buffer to a physical address.

14. The computer-readable storage medium of claim 10, further comprising instructions to cause one or more processors to:
    locate a backing store by contacting a storage manager; and receive a new object for the file.

* * * * *